US010114894B2

(12) United States Patent
Berentsen et al.

(10) Patent No.: US 10,114,894 B2
(45) Date of Patent: Oct. 30, 2018

(54) ENHANCING A SEARCH WITH ACTIVITY-RELEVANT INFORMATION

(71) Applicant: International Business Machines Corporation, Armonk, NY (US)

(72) Inventors: Lambert Scott Berentsen, Jonestown, TX (US); Gregory J. Boss, Saginaw, MI (US); Sachin K. Mahajan, Pune (IN); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 414 days.

(21) Appl. No.: 14/867,519

(22) Filed: Sep. 28, 2015

(65) Prior Publication Data

US 2017/0091325 A1    Mar. 30, 2017

(51) Int. Cl.
*G06F 17/30* (2006.01)

(52) U.S. Cl.
CPC .... *G06F 17/30864* (2013.01); *G06F 17/3053* (2013.01)

(58) Field of Classification Search
None
See application file for complete search history.

(56) References Cited

U.S. PATENT DOCUMENTS

| 6,411,962 | B1 | 6/2002 | Kupiec | |
|---|---|---|---|---|
| 7,953,746 | B1 * | 5/2011 | Garg | G06F 17/30864 707/762 |
| 8,069,169 | B2 * | 11/2011 | Fitzpatrick | G06F 17/30867 707/732 |
| 8,538,359 | B2 * | 9/2013 | Yen | H04W 52/0274 455/127.5 |
| 8,539,359 | B2 * | 9/2013 | Rapaport | G06Q 10/10 709/217 |
| 8,554,873 | B1 * | 10/2013 | Ganesh | G06Q 30/0261 709/206 |
| 9,129,020 | B2 * | 9/2015 | Buchmueller | G06F 17/30699 |
| 9,773,064 | B1 * | 9/2017 | Garg | G06F 17/30867 |
| 2007/0094042 | A1 * | 4/2007 | Ramer | G06F 17/30867 705/1.1 |
| 2011/0208730 | A1 * | 8/2011 | Jiang | G06F 17/30864 707/727 |

(Continued)

OTHER PUBLICATIONS

Anonymously; A system and a method to create customizable results snippets in a free-text search software application, Sep. 15, 2011.

(Continued)

*Primary Examiner* — Debbie Le
(74) *Attorney, Agent, or Firm* — Garg Law Firm, PLLC; Christopher K. McLane

(57) ABSTRACT

For online searching, data of a user activity is analyzed where the user activity occurs at an application other than a search application and the search application is used for the online searching. In response to the analyzing, a topic of interest of the user is identified. A search term input is detected at the search application. A subject of the search term is identified. The search term is modified using a modifier. The modifier is a term related to the topic of interest, and the online searching occurs in response to the modified search term.

14 Claims, 6 Drawing Sheets

(56) References Cited

U.S. PATENT DOCUMENTS

| | | | | |
|---|---|---|---|---|
| 2012/0150861 A1* | 6/2012 | Thione | .............. | G06F 17/30991 |
| | | | | 707/741 |
| 2012/0269116 A1* | 10/2012 | Xing | ................... | G06F 17/3064 |
| | | | | 370/328 |
| 2013/0159885 A1* | 6/2013 | Yerli | ...................... | G06Q 10/10 |
| | | | | 715/753 |

OTHER PUBLICATIONS

Firefox; Add-Ons, https://addons.mozilla.org/en-US/firefox/addon/searchpreview/, 2015.
Appendix P, 2016.

\* cited by examiner

ENHANCING A SEARCH WITH ACTIVITY-RELEVANT INFORMATION

TECHNICAL FIELD

The present invention relates generally to a method, system, and computer program product for online searching of information. More particularly, the present invention relates to a method, system, and computer program product for enhancing a search with activity-relevant information.

BACKGROUND

Online search is a method of using a search engine, which executes on a computer, to search for information that is available in electronic form. Many search engines are presently available for performing online searches.

For example, some search engines, which execute on a server data processing system that is accessible over a data network, can be accessed by client-side component executing on a client data processing system, e.g., a user's computer system. A search application on a client data processing system, which can be accessed via an Application Program Interface (API), a command-line prompt, or some other integration mechanism can also be used on a client data processing system to access the server-side implementation of a search engine. For example, a search application can be a stand-alone interface for accessing the search engine.

As another example, the search application can be integrated into another application to enable the other application to access the search engine. A search bar embedded in a browser application on a client data processing system is one example of such an integrated client-side component.

Hereinafter, "search engine" refers to the server-side implementation of the application that accesses the searchable data and performs a requested search query. Hereinafter, "search application" refers to a client-side application or component, using which a user can send a search term or query to the search engine. A user of a search application can be a human, a hardware system, or a software application.

Typically, a user provides the search application a word, phrase, text snippet, or a string of alphanumeric or symbolic characters, as a search term. The search application communicates the search term to the search engine. The search engine forms a search query using the search term. The search engine accesses data, which comprises a repository of information or an index thereof stored electronically.

The search engine performs the search query on the data and obtains a result set. The result set includes data that corresponds to the search query. The search engine returns the result set to the search application. The search application provides or presents the result set to the user.

In some cases, a search engine may perform some processing of the result set before sending the result set to the search application. For example, a search engine may insert advertisements into the result set, arrange the result set in some order, such as according to the age of the results in the result set, and the like.

Presently, it is quite common to receive a result set of hundreds if not thousands of results that correspond to a search term. Even when sorted, the sheer volume of data in the result set can overwhelm the user. Often, the user has to expend time and computing resources to process the data of at least a few irrelevant or less-than-useful results to reach the data of a result that appears to be relevant to the user's intention for searching.

For example, a user may have to click a Uniform Resource Locator (URL), download the content from the website of the URL, click through or scroll past at least some of the downloaded content, to conclude that the URL did not lead to information that is useful according to the user's intentions behind the search. The user then has to repeat this sequence of operation repeatedly with other URLs in other results in the result set before finding a result that is satisfactory to the user, if any.

Some search engines return a preview of the contents of a result that is included in the result set. For example, a search engine may show a title of a result, a URL of the result, and one or two lines of text from the content at the URL as a preview. As another example, another search engine may show as a preview a thumbnail image of a website of a URL that is included in the result set. In rare cases, the user may find the information of interest in the preview, but in most cases, the previews only allow a user to quickly form an opinion about a particular result in the result set, without having to access the URL and read the content available there.

In some search engines, if a preview includes a portion of the search term, the search engines highlight that portion of the search term in the preview. This highlighting, such as by boldfacing, underlining, color-changing, or font-scaling the portion of the search term helps to draw the user's attention to the portion of the search term that caused the inclusion of the result in the result set. The drawing of the attention is also designed to aid the user in a speedy elimination of some results from consideration, and a quick evaluation of the relevance of a result to the search term.

SUMMARY

The illustrative embodiments provide a method, system, and computer program product for enhancing a search with activity-relevant information. An embodiment includes a method for online searching. The embodiment analyzes, using a processor and a memory, data of a user activity, the user activity occurring at an application other than a search application, where the search application is used for the online searching. The embodiment identifies, responsive to the analyzing, a topic of interest of the user. The embodiment detects a search term input at the search application. The embodiment identifies a subject of the search term. The embodiment modifies the search term using a modifier, wherein the modifier is a term related to the topic of interest, and wherein the online searching occurs responsive to the modified search term.

Another embodiment includes a computer program product for online searching, the computer program product comprising one or more computer-readable storage devices, and program instructions stored on at least one of the one or more storage devices.

Another embodiment includes a computer system for online searching, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
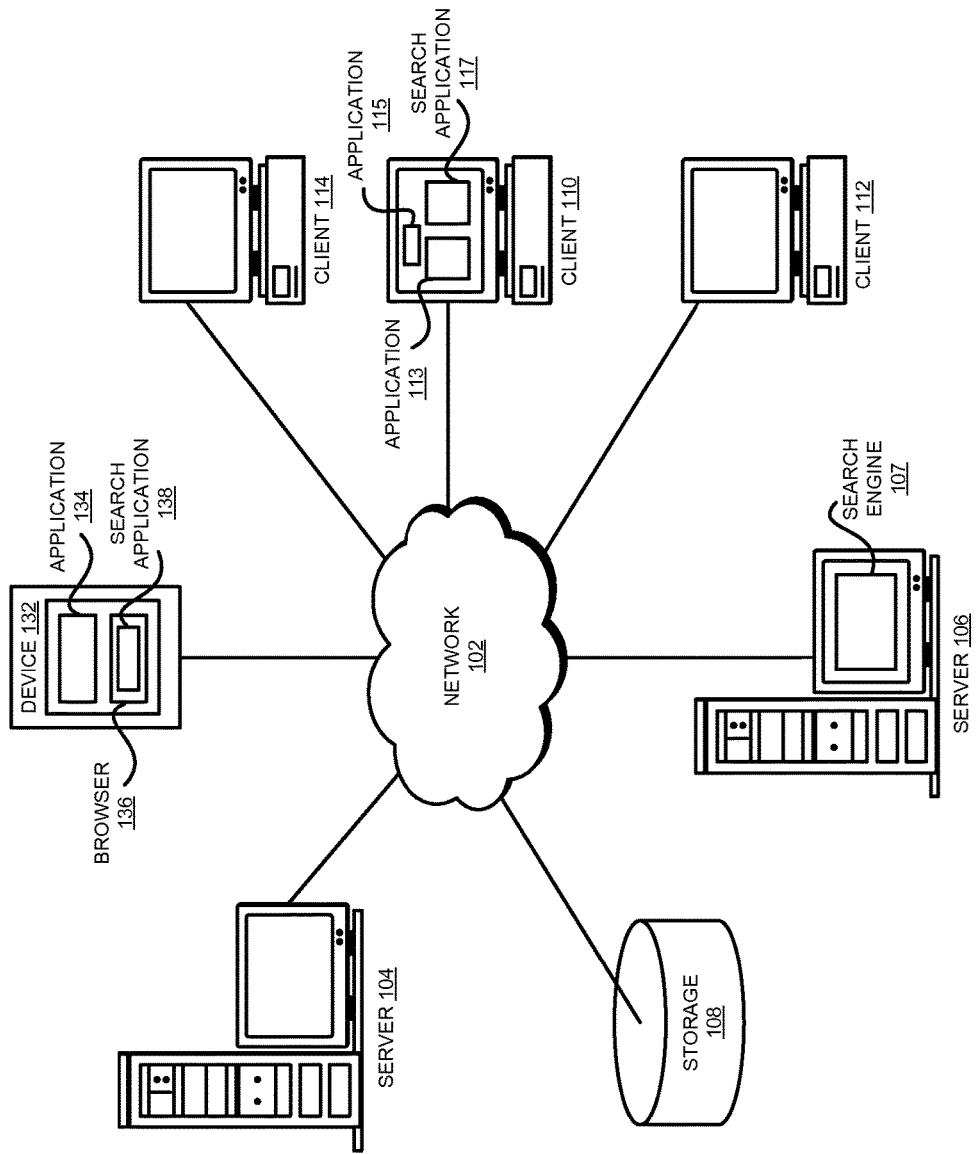
FIG. 1 depicts a block diagram of a network of data processing systems in which illustrative embodiments may be implemented.

The illustrative embodiments recognize that sifting through the result set of a search is presently a time-consuming and computing resource-intensive task. This is particularly true of the mobile devices, such as smartphones and tablet computers, which operate with significantly less computing resources than a laptop or a desktop computer.

Furthermore, the previews available in the presently used search applications are also ineffective in helping the user reach a result that most relates to the user's expectations. Textual previews may or may not include the text that is indicative of the user's expectations, and thumbnail previews can be counterproductive by cluttering the screen with difficult to read small fonts.

The illustrative embodiments further recognize that a search term selected by a user often does not relate to an expectation of a user. For example, many users use overly broad search terms in the hope of casting a wide net and catching something of interest in the process. Many other users use overly narrow search terms in the hopes of limiting the result set through which they will have to sift. Either approach is ineffective in a vast majority of cases for either producing an unmanageably large result set because of an overly broad search term or excluding a desirable result from the result set because of an overly precise search term.

The illustrative embodiments recognize that users need assistance in defining a search term in such a way that the result set includes results that have a high correlation to the search term, a high correlation to an activity or interest of the user, and correspond to some mandatory and some flexible parts of the search term. In other words, the illustrative embodiments recognize a need to modify a user-entered search term such that the search term is indicative of a user's interest, related to a user's past activities, binds the result set to relate to some mandatory portions of the search term, or some combination thereof.

The illustrative embodiments used to describe the invention generally address and solve the above-described problems and other problems related to online search. The illustrative embodiments provide a method, system, and computer program product for enhancing a search with activity-relevant information.

An embodiment executes as an application in, or in conjunction with, a search application at a client data processing system. For example, an embodiment can be implemented as a modification of an existing search application such that the modified search application operates in a manner described herein. Another example embodiment can be adapted to integrate with a search application using an API or other integration methods, to operate in a manner described herein.

Consider the following example—a user has a keen interest in all things Elon Musk. The user reads news articles on news websites about Musk's space venture, innovative endeavors, and charities. The user also follows the Musk's profile on a social media page and tracks major announcements from Musk in a calendar. The user is a scientifically inclined individual who discusses scientific and innovation-related topics on social media. The user's journal application includes entries concerning rocket launch-related news items about Musk's space venture from space exploration websites.

From this example, it is clear that the user has science and innovative technologies as an interest, and that the user is particularly interested in technologies associated with Musk's companies. Now assume that the user wishes to perform a search for new cars on sale and enters the search term "new car sale" in a search application. As a non-limiting example, an embodiment modifies the search term "new car sale" with "Elon Musk". The result set of the modified search term presents to the user several listings or events for Tesla cars (Tesla is a registered trademark of Tesla Motors, Inc. in the United States and other countries). Having interests in science, innovative technologies, and Musk, the search results more likely to be relevant and appealing to the user than the prior-art search results which could list a wide variety of new cars and car dealer advertising in the search result, presenting the user with the same problems as described earlier.

Note that nothing in the search term for this search, or previous search terms entered in the search application, are Musk-related. The user's activities that serve the user's interests occur elsewhere, e.g., in on a website page visited via a browser, in a journal application, in a calendaring application, and other applications that the user uses. And the search term modification in the search application results from such activities outside the search application.

Operationally, to accomplish a search term modification in this manner, an embodiment monitors the user's activities in various applications. For example, the embodiment captures the user's messages in a social media application, scans calendar or journal updates for new or changed information, obtains a browser history from the user's favorite browser, and the like.

One embodiment allows the user to configure, e.g., in a profile, which applications the embodiment can monitor in this manner. For example, a user may have multiple social media profiles, only one of which the user may want the embodiment to monitor. As another example, the user may not want the embodiment to monitor the user's journal, or the user may expressly add a particular application for the embodiment to monitor in this manner.

An embodiment analyzes the information collected from the various applications as a result of such monitoring. The analysis identifies the user's interests and activities. For example, in case of the above example user, such an analysis identifies science and innovative technologies as one interest, and technologies associated with Musk's companies as another interest.

The embodiment maintains a repository of words or phrases that correspond to the identified interests. For example, if the interest is Musk companies, the embodiment locates words that describe Musk companies, and identifies Tesla and "electric car" as some of those words. Accordingly, the embodiment stores, "Elon", "Musk", "Elon Musk", "Tesla", and "electric car" in the repository.

The words or phrases that are indicative of an activity or an interest of the user are also referred to herein as modifiers. A repository of such words or phrases is also referred to as a repository of modifiers. A modifier provides a context to a search term. A context is a relevance of one thing to another. A modifier forms a relevance between a search term and an interest or an activity. In the above example, shopping for a new car was the original scope of the search, but the phrase "Elon Musk" provides context to that original scope and modifies the scope such that the search results have a relevance to the user's interest in Musk's companies, and causes the result set to have a greater relevance to the user's unexpressed search interest in an innovative technology from a Musk company when shopping for a new car.

Different interests and activities can have different time periods of relevance. For example, an interest in a subject of breaking news may have a much shorter temporal aspect—time period of relevance—than a user's interest in science. Where the subject of the breaking news may be relevant as an interest only for a few hours, the interest in science is relevant for many years. Similarly, a topic of a social media message may be relevant for modifying a search for only a few minutes, a few hours, few days, or even longer, depending on the topic.

An embodiment allows a user to configure—in a profile—temporal aspects for various interests. Another embodiment allows a dynamic determination of a temporal aspect of an identified interest or activity. For example, the embodiment may assign a default period of relevance to a newly identified interest or activity, and modify the period according to additional or continuing monitoring of the user's interactions in other applications. The more the user interacts about the interest, the longer the temporal aspect of that interest becomes. If the user ceases to have interactions about the interest, the relevance of the interest terminates after the temporal aspect of that interest elapses.

Another embodiment modifies the search term to ensure that each result in the result set includes a portion of the search term that is marked as mandatory. For example, the embodiment not only adds "Elon Musk" to the original search term, but also modifies the word "car" in the original search term with an "electric" prefix. The prefix "electric" is marked in some suitable manner, such as within brackets, in the modified search term to indicate its mandatory nature.

Such a modification results in an example modified search term "new [electric] car sale Elon Musk". Now, not only do the results have to be relevant to the user's interest in Musk companies, but all results in the result set must also include the word "electric" in the preview portion of the result. Furthermore, one embodiment causes the mandatory word or phrase to be highlighted in any suitable manner in the preview.

A method of an embodiment described herein, when implemented to execute on a device or data processing system, comprises substantial advancement of the functionality of that device or data processing system for enhancing a search with activity-relevant information. For example, prior-art method of online search causes an overwhelming volume of results to be presented to a user. The prior-art method of online search has no capabilities for determining a user's interest or activity outside of the search application, and for modifying a user-entered search term according to this identified interest or activity. This problem is exacerbated when the search is submitted from a mobile device. An embodiment provides a method for determining a user's interests and activities from other applications, creating a repository of modifiers, selecting one or more suitable modifiers to modify a search term, and obtain search results that relate to the interest which the user does not state in the search term. Executing a search in this manner provides a context to the search term and makes the search term far more relevant to the user's interests than the original search term entered by the user. The results in the result set therefore correspond to the user's interests, and can also present a mandatory word or phrase in the preview to further allow a much faster selection of a particular result as compared to the prior art. Such a manner of modifying a search term is unavailable in presently available devices or data processing systems. Thus, a substantial advancement of such devices or data processing systems by executing a method of an embodiment is in making the search results relevant to an interest of the user, which the user need not identify or specify in the search application. Furthermore, the search results can also include a mandatory word or phrase in the preview reducing the workload in selecting a result from the result set.

The illustrative embodiments are described with respect to certain search applications, applications, search engines, search terms, modifications, modifiers, words, phrases, results, result sets, highlighting, times, temporal aspects, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
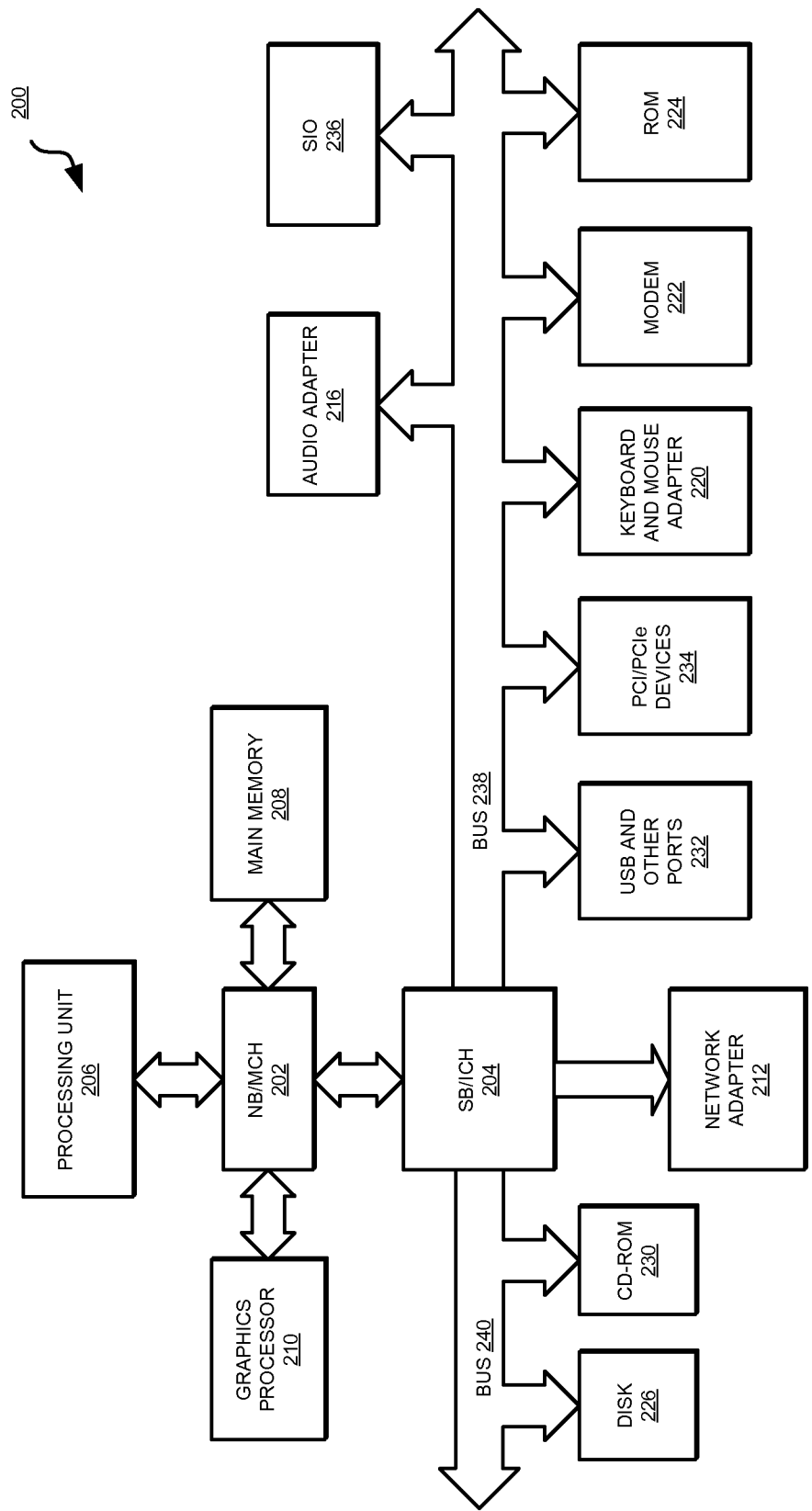
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 134 implements an embodiment described herein in device 132. For example, application 134 monitors browser 136 to collect data about a user's interests and activities. When the user enters a search term in search application 138, application 134 modifies the search term as described herein. In the depicted non-limiting example, search application 138 is shown embedded in browser 136. Application 113 implements an embodiment described herein in client 112. For example, application 113 monitors application 115, which may be a journal application or a calendar application as some non-limiting examples, to collect data about a user's interests and activities. When the user enters a search term in search application 117, application 113 modifies the search term as described herein. In the depicted non-limiting example, search application 138 is shown as an independently executing application in client 112. Search applications 138 and 117 submit the modified search term to search engine 107 in server 106, which provides interest-relevant or activity-relevant result set of search results in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 and 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
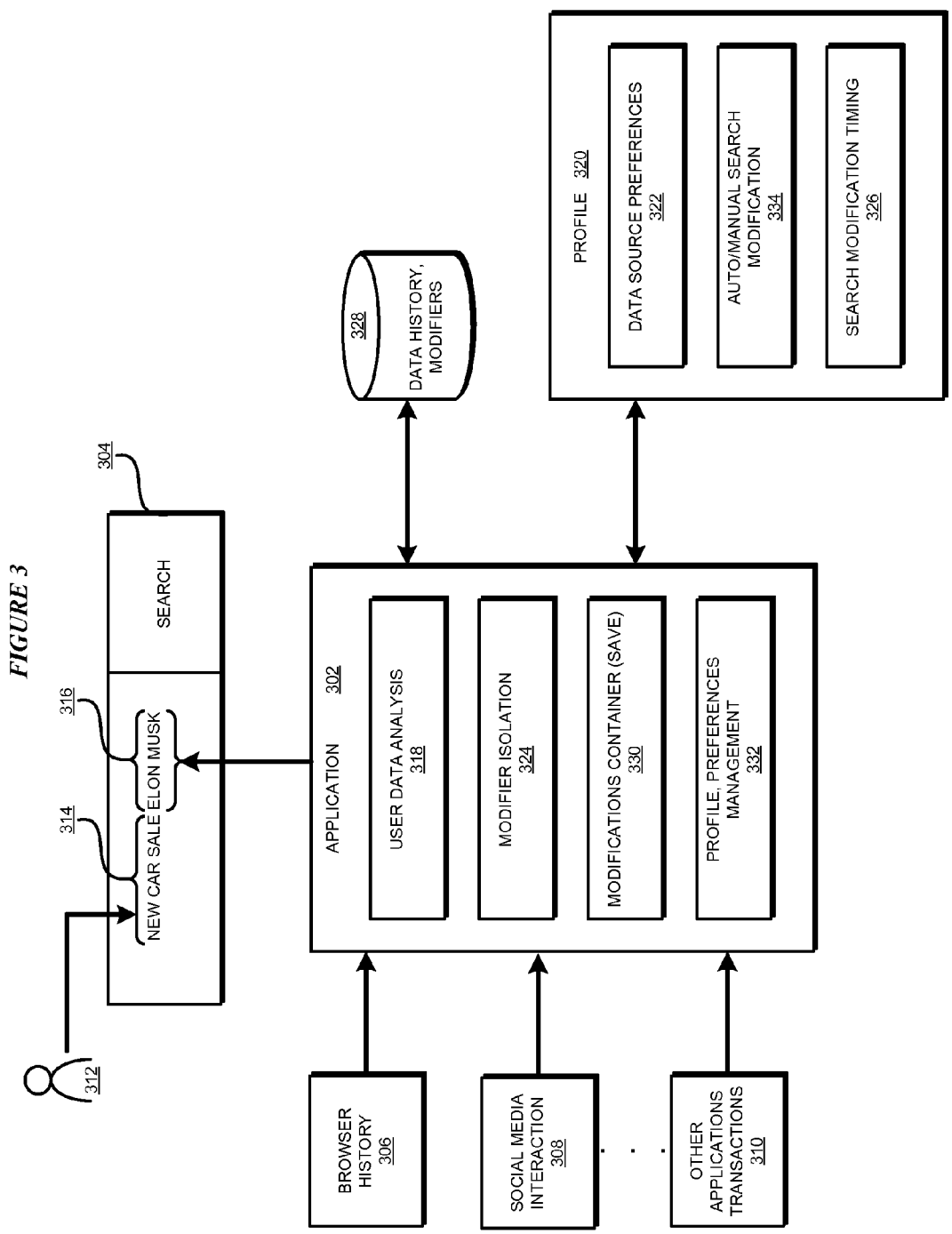
FIG. 3 depicts a block diagram of an example configuration for enhancing a search with activity-relevant information in accordance with an illustrative embodiment.

With reference to FIG. 3, this figure depicts a block diagram of an example configuration for enhancing a search with activity-relevant information in accordance with an illustrative embodiment. Application 302 is an example of application 134 or 113 in FIG. 1. Search application 304 is an example of search application 138 or 117 in FIG. 1.

Each of data sources 306, 308, and 310, and any number thereof, are examples of data sources accessible from applications 136 or 115 in FIG. 1. As a non-limiting example, data source 306 is depicted as a browser history, which is maintained by browser 136 in FIG. 1. As another non-limiting example, data source 308 is depicted as social media interaction information, which is available from application 115 in FIG. 1, which may be a social media application. Applications, such a calendaring application or a journaling application, may serve as a source of other types of transactions or interactions, as represented by data source 310.

User 312 is depicted as a human user only as a non-limiting example, and can be a system or an application within the scope of the illustrative embodiments. Assume that user 312 enters search term 314, "new car sale". Application 302 modifies search term 314 by adding modifier 316. To construct and insert modifier 316 into the search term, application 302 operates as follows—

Component 318 receives user interaction data from any number of data sources 306, 308, and/or 310. As an example, according to one embodiment, profile 320 may include section 322, which allows a user to specify which data sources can be monitored for obtaining information in this manner. Assume that section 322 permits component 318 to monitor the applications that server as data sources 306, 308, and 310.

Component 318 analyzes the collected information, such as by using Natural Language Processing (NLP). Existing NLP techniques can identify a topic of interest or a subject of an activity from the information collected from one or more data sources 306-310.

Component 324 isolates a modifier from such analysis. For example, if the analysis of component 318 shows a topic of interest as "Elon Musk", component 324 isolates, "Elon Musk", "Tesla", and "electric car" as possible modifiers. As an example, to identify or isolate such modifiers, component 324 may use a lexicon, a thesaurus, an encyclopedia—e.g. Wikipedia, or other information sources to find terms related to the topic of interest or an activity. The terms related to the topic of interest or activity can be synonyms, words in a related subject matter, and words or phrases related to the interest or activity.

To find a modifier, component 324 further uses a timing criterion. In one embodiment, as described elsewhere in this disclosure, component 324 can assign and revise a default period to an interest or activity identified by component 318. Component 324 finds suitable modifiers corresponding to the interest or activity while the period has not elapsed. As another example, in another embodiment, profile 320 includes section 326, where a user can specify time periods of relevance for various interests and activities. Component 324 uses the specified periods for finding suitable modifiers corresponding to the interest or activity while the specified period has not elapsed.

Repository 328 is a repository of modifiers. Component 330 stores any modifiers, interests, or activities in repository 328. Under certain circumstances, repository 328 can also store data collected from data sources 306-310, such as for re-analysis with more data when more data becomes available later from data sources 306-310.

Component 332 manages profile 320. For example, component 332 enables the creation of the various sections, manipulations thereof, and interaction therewith for a user. For example, using component 332, a user can configure section 334 in profile 320, whereby a user can specify whether application 302 can automatically modify a search term entered by the user, or whether the user should be presented with a selection of modifiers that application 302 has selected of ruse with the search term. In some cases, section 334 can also allow the user to specify when or under what circumstances should application 302 automatically modify a search term, and when or under what circumstances application 302 should present modification options to the user.

Figure 4:
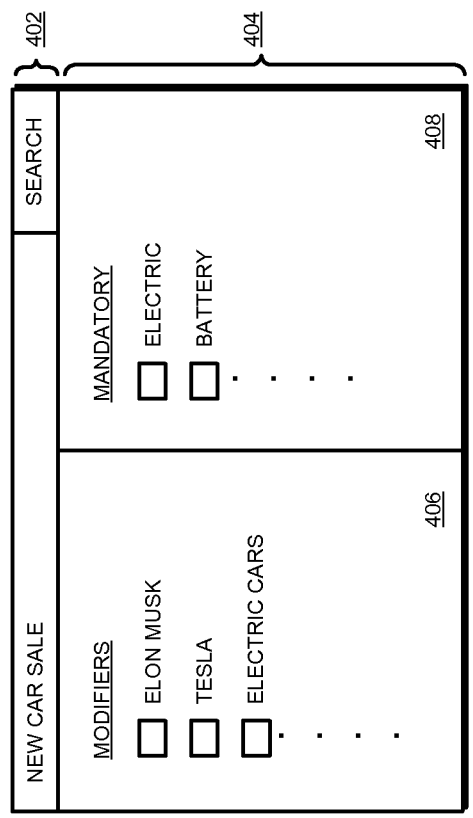
FIG. 4 depicts a block diagram of presenting options for search term modification in accordance with an illustrative embodiment.

With reference to FIG. 4, this figure depicts a block diagram of presenting options for search term modification in accordance with an illustrative embodiment. Block 402 is presented by a search application, such as by search application 138 or 117 in FIG. 1. Block 404 is presented by application 302 in FIG. 3.

For example, block 402 includes the user-provided search term. In a manner described with respect to section 334 of profile 320 in FIG. 3, when a user wishes to review or select a modification of the search term, application 302 presents block 404, which includes one or more sections. As an example, section 406 is used to present any number of modifiers that application 302 selects for the search term in block 402. The user can select for use any number of modifiers from section 406, including selecting no modifiers at all.

As another example, section 408 is used to present any number of mandatory words or phrases that application 302 selects for the search term in block 402. The user can select for use any number of mandatory words or phrases from section 408, including selecting no modifiers at all. The selected modifiers and/or mandatory words or phrases operate in a manner described in this disclosure.

Figure 5:
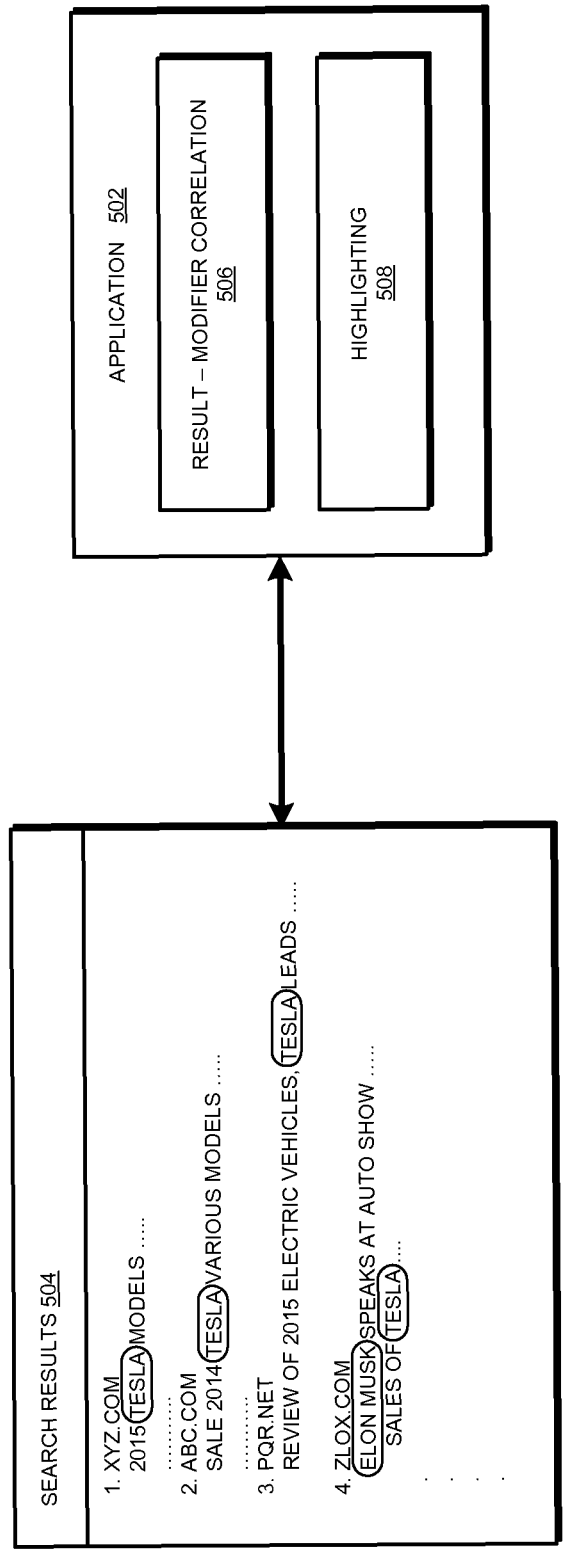
FIG. 5 depicts a block diagram of highlighting a result set in accordance with an illustrative embodiment.

With reference to FIG. 5, this figure depicts a block diagram of highlighting a result set in accordance with an illustrative embodiment. Application 502 is an example of application 302 in FIG. 3, and includes additional features. Search results 504 comprises a result set returned by search engine 107 in FIG. 1, in response to a modified search term produced by application 302 in FIG. 3.

Assume that application 302 modified the search term "new car sale" as "'new car sale' 'Elon Musk'". When search results 504 are received at the client data processing system, component 506 detects the presence of terms in a result that correspond to a modifier. For example, if modifier "Elon Musk" was used, a corresponding term in repository of modifiers 328 is "Tesla", which appears in results 1, 2, 3, and 4. Similarly, "Elon Musk" itself is a modifier, which appears in result 4.

Once component 506 has identified such terms in search results 504, component 508 highlights the terms in any suitable manner. The highlighted results of search results 504 are presented to the user.

Operating in a similar manner, if a mandatory word or phrase was specified in the modified search term, component 506 locates those mandatory words or phrases in the results. Component 508 highlights those mandatory words or phrases in a similar manner. For example, in one embodiment, a modifier is highlighted differently than a mandatory word or phrase.

Figure 6:
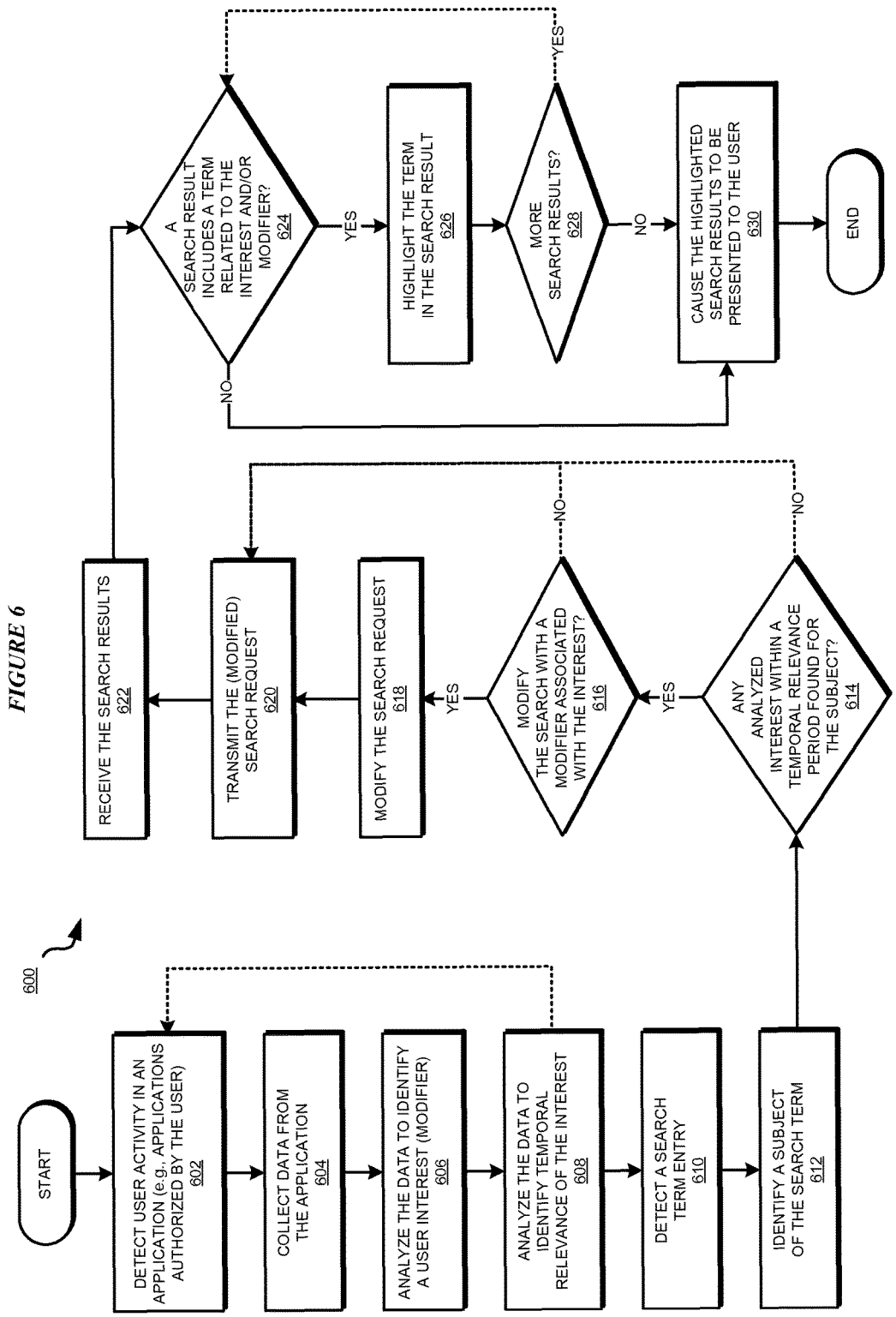
FIG. 6 depicts a flowchart of an example process for enhancing a search with activity-relevant information in accordance with an illustrative embodiment.

With reference to FIG. 6, this figure depicts a flowchart of an example process for enhancing a search with activity-relevant information in accordance with an illustrative embodiment. Process 600 can be implemented in application 502 in FIG. 5.

The application detects a user activity in an application which can serve as a data source (block 602). For example, the application monitors those applications for user activity for which the user has configured a permission to monitor in a profile.

The application collects user activity data from such a monitored application (block 604). The application analyzes the data to identify an interest of the user (block 606). The application further analyzes the data to identify a temporal relevance of the interest (block 608). The application repeats blocks 602-608 for any number of data sources that may be available.

The application detects that the user has entered a search term in a search application (block 610). The application identifies a subject of the search term, such as by using an existing NLP technique (block 612).

The application determines whether any analyzed interest of the user is within a temporal relevance period for use with the subject of the search term (block 614). If no analyzed interest of the user is within a temporal relevance period for use with the subject of the search term ("No" path of block 614), the application proceeds to block 620.

If any analyzed interest of the user is within a temporal relevance period for use with the subject of the search term ("Yes" path of block 614), the application determines whether modification is permitted of the search term with a modifier associated with the interest (block 616). If modification of the search term is not permitted, e.g., when a user has prevented a modification of the search term ("No" path of block 616), the application proceeds to block 620.

If modification of the search term is permitted, whether automatically or through user approval as in FIG. 4 ("Yes" path of block 616), the application modifies the search term (block 618). The application transmits the modified or unmodified search term, as the case may be depending on how block 620 is reached in process 600, (block 620).

The application receives the search results (block 622). The application determines whether a result in the search results includes a term related to the interest or a modifier, or both (block 624). If no result in the search results includes a term related to the interest or a modifier, or both ("No" path of block 624), the application proceeds to block 630.

If a result in the search results includes a term related to the interest or a modifier, or both ("Yes" path of block 624), the application highlights the term in the result (block 626). The application determines whether more results in the search results have to be analyzed and highlighted in this manner (block 628). If more results in the search results have to be analyzed and highlighted in this manner ("Yes" path of block 628), the application returns to block 624.

If no more results in the search results have to be analyzed and highlighted in this manner ("No" path of block 628), the application causes the highlighted and/or non-highlighted results, as the case may be, to be presented to the user (block 630). The application ends process 600 thereafter.

Process 600 has been described with respect to modifying a search term using interest or activity-relevant modifiers. From this disclosure, those of ordinary skill in the art will be able to adapt process 600 to similarly use mandatory words or phrases instead of or in conjunction with the modifiers, and such adaptations are contemplated within the scope of the illustrative embodiments.

Thus, a computer implemented method, system or apparatus, and computer program product are provided in the illustrative embodiments for enhancing a search with activity-relevant information. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for online searching, the method comprising:
monitoring for user activity occurring at an application other than a search application, wherein the monitoring occurs because of a permission to monitor by the user, the permission being configured by the user in a user profile associated with the user, wherein the search application is used for online searching;
detecting, responsive to the monitoring, the user activity at the application;
collecting data of the user activity from the application responsive to the detecting;
analyzing, using a processor and a memory, the data of the user activity, the user activity occurring at the application;
identifying, responsive to the analyzing, a topic of interest of the user;
detecting a search term input at the search application;
identifying a subject of the search term;
modifying the search term using a modifier, wherein the modifier is a term related to the topic of interest, and wherein the online searching occurs responsive to the modified search term;
further modifying the search term to use a mandatory term, wherein the mandatory term must appear in a preview of each result in a result set, the result set being responsive to the online searching using the modified search term, wherein the mandatory term is selected by the user from a list of mandatory terms;
receiving a result set responsive to the online searching using the modified search term;
determining whether a preview of a result in the result set includes a portion corresponding to one of (i) the topic of interest, (ii) the modifier, and (iii) a term stored in a modifier repository in association with the modifier;
highlighting the portion; and
highlighting in each result in the result set, the mandatory term, wherein the mandatory term is highlighted differently than the portion.

2. The method of claim 1, further comprising:
causing the search application to transmit the modified search term to a search engine, wherein the search engine executes on a server data processing system, and wherein the search application executes using the processor and the memory at a client data processing system.

3. The method of claim 1, further comprising:
determining whether a time period of relevance of the modifier has elapsed, wherein the modifying occurs responsive to the time period of relevance of the modifier not having elapsed.

4. The method of claim 1, further comprising:
finding, using a data source, a set of modifiers corresponding to the topic of interest; and storing the set of modifiers in a repository, wherein the modifier is stored in the repository as a member of the set of modifiers.

5. The method of claim 1, wherein the identifying uses Natural Language Processing (NLP).

6. The method of claim 1, further comprising:
further analyzing the data to determine a time period of relevance of the topic of interest, wherein a second topic of interest has a different time period of relevance than the time period.

7. The method of claim 6, further comprising:
obtaining additional data from the application, the additional data relating to additional user activity at the application, wherein the additional user activity is of a type of the user activity; and
revising, responsive to analyzing the additional data, the time period of relevance of the topic of interest.

8. The method of claim 1, wherein the method is embodied in a computer program product comprising one or more computer-readable storage devices and computer-readable program instructions which are stored on the one or more computer-readable tangible storage devices and executed by one or more processors.

9. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

10. A computer program product for online searching, the computer program product comprising one or more computer-readable storage devices, and program instructions stored on at least one of the one or more storage devices, the stored program instructions comprising:
program instructions to monitor for user activity occurring at an application other than a search application, wherein the monitoring occurs because of a permission to monitor by the user, the permission being configured by the user in a user profile associated with the user, wherein the search application is used for online searching;

program instructions to detect, responsive to the monitoring, the user activity at the application;

program instructions to collect data of the user activity from the application responsive to the detecting;

program instructions to analyze, using a processor and a memory, the data of the user activity, the user activity occurring at the application;

program instructions to identify, responsive to the analyzing, a topic of interest of the user;

program instructions to detect a search term input at the search application;

program instructions to identify a subject of the search term;

program instructions to modify the search term using a modifier, wherein the modifier is a term related to the topic of interest, and wherein the online searching occurs responsive to the modified search term;

program instructions to further modify the search term to use a mandatory term, wherein the mandatory term must appear in a preview of each result in a result set, the result set being responsive to the online searching using the modified search term, wherein the mandatory term is selected by the user from a list of mandatory terms;

program instructions to receive a result set responsive to the online searching using the modified search term;

program instructions to determine whether a preview of a result in the result set includes a portion corresponding to one of (i) the topic of interest, (ii) the modifier, and (iii) a term stored in a modifier repository in association with the modifier;

program instructions to highlight the portion; and program instructions to highlight in each result in the result set, the mandatory term, wherein the mandatory term is highlighted differently than the portion.

11. The computer program product of claim 10, further comprising:

program instructions to cause the search application to transmit the modified search term to a search engine, wherein the search engine executes on a server data processing system, and wherein the search application executes using the processor and the memory at a client data processing system.

12. The computer program product of claim 10, further comprising:

program instructions to determine whether a time period of relevance of the modifier has elapsed, wherein the modifying occurs responsive to the time period of relevance of the modifier not having elapsed.

13. The computer program product of claim 10, further comprising:

program instructions to find, using a data source, a set of modifiers corresponding to the topic of interest; and storing the set of modifiers in a repository, wherein the modifier is stored in the repository as a member of the set of modifiers.

14. A computer system for online searching, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to monitor for user activity occurring at an application other than a search application, wherein the monitoring occurs because of a permission to monitor by the user, the permission being configured by the user in a user profile associated with the user, wherein the search application is used for online searching;

program instructions to detect, responsive to the monitoring, the user activity at the application;

program instructions to collect data of the user activity from the application responsive to the detecting;

program instructions to analyze, using a processor and a memory, the data of the user activity, the user activity occurring at the application;

program instructions to identify, responsive to the analyzing, a topic of interest of the user;

program instructions to detect a search term input at the search application;

program instructions to identify a subject of the search term;

program instructions to modify the search term using a modifier, wherein the modifier is a term related to the topic of interest, and wherein the online searching occurs responsive to the modified search term;

program instructions to further modify the search term to use a mandatory term, wherein the mandatory term must appear in a preview of each result in a result set, the result set being responsive to the online searching using the modified search term, wherein the mandatory term is selected by the user from a list of mandatory terms;

program instructions to receive a result set responsive to the online searching using the modified search term;

program instructions to determine whether a preview of a result in the result set includes a portion corresponding to one of (i) the topic of interest, (ii) the modifier, and (iii) a term stored in a modifier repository in association with the modifier;

program instructions to highlight the portion; and program instructions to highlight in each result in the result set, the mandatory term, wherein the mandatory term is highlighted differently than the portion.

* * * * *